United States Patent [19]

Wilde et al.

[11] 4,173,243
[45] Nov. 6, 1979

[54] SAFETY TIRE AND WHEEL RIM ASSEMBLY

[75] Inventors: Ralph Wilde, Semele, Near Leamington; Barrie J. Allbert, Sutton Coldfield, both of England

[73] Assignee: Dunlop Limited, Great Britain

[21] Appl. No.: 913,090

[22] Filed: Jun. 6, 1978

Related U.S. Application Data

[63] Continuation of Ser. No. 728,224, Sep. 30, 1976, abandoned.

[30] Foreign Application Priority Data

Oct. 17, 1975 [GB] United Kingdom .............. 42602/75

[51] Int. Cl.² .............................................. B60C 17/04
[52] U.S. Cl. .............................. 152/158; 152/330 RF
[58] Field of Search .............. 152/158, 399, 400, 402, 152/403

[56] References Cited

U.S. PATENT DOCUMENTS

| 1,108,546 | 8/1914 | Bosworth | 152/403 |
| 1,237,398 | 8/1917 | Sjobring | 152/158 |
| 1,771,963 | 7/1930 | Krone | 152/158 |
| 2,040,645 | 5/1936 | Dickinson | 152/158 |
| 3,635,273 | 1/1972 | Patecell | 152/158 |
| 4,046,182 | 9/1977 | Farnsworth | 152/330 RF |

FOREIGN PATENT DOCUMENTS 2535314  2/1976  Fed. Rep. of Germany ........... 152/158

Primary Examiner—Joseph F. Peters, Jr.
Assistant Examiner—D. W. Underwood
Attorney, Agent, or Firm—Stevens, Davis, Miller & Mosher

[57] ABSTRACT

A safety tire and wheel rim assembly having a safety support member comprising a plurality of arcuate segments of rigid material coupled together at their ends and mounted in a channel-shaped bearing ring mounted on the wheel rim wherein the bearing ring is located against tire beads to retain them in position.

5 Claims, 4 Drawing Figures

SAFETY TIRE AND WHEEL RIM ASSEMBLY

This is a continuation of application Ser. No. 728,224 filed Sept. 30, 1976 and now abandoned.

This invention relates to safety tire and wheel rim assemblies incorporating an annular safety support member intended to become load bearing if the tire becomes deflated.

Such safety support members are described in U.K. Patent Specification No. 1,375,415 or equivalent U.S. Pat. No. 3,635,273. The support member may be of rigid plastics or metal such as aluminium alloy and is preferably formed by interconnected segments.

According to the present invention a safety tire and wheel rim assembly comprises a pneumatic tire having a tread, sidewalls and beads, a wheel rim having a pair of bead seats and between the bead seats a substantially uniform diameter, a safety support member to act as a load carrying member in the event of tire deflation, the safety support member comprising a plurality of arcuate segments or rigid material coupled together by means of coupling portions at their ends, a bearing ring of rigid material having a channel shape in cross-section, providing a bearing in which the support member is rotatably mounted, and locating means contacting both tire beads to locate the bearing ring axially of the assembly and retain the tire beads in position.

The pneumatic tire in the assembly may be of the tubeless type and of either cross-ply or radial construction.

The bearing ring may be divided about a radial plane within the smaller external bearing diameter so that the bearing ring may be assembled onto a pre-assembled or partly pre-assembled support member. The bearing ring may also comprise two or more segments for interconnection in the same manner as the support member. Preferably the segments are the same in length and number as the segments of the support member.

The locating means may be integral shoulders provided on either side of the bearing ring or may be separate spacer rings. The spacer rings may be of resilient material for example rubber and may be solid or include voids. Preferably, however, the spacer rings are sufficiently hard to prevent bead dislodgement.

A low friction coating may be applied to the bearing surface of the bearing ring, for example a P.T.F.E. (Polytetrafloroethylene) coating, or alternatively a lubricant may be applied on assembly. A low friction material may also be provided at the surface of the support member contacting the tire.

Furthermore, a degree of resilience may be provided in the safety support member by means of including a layer or layers of resilient material in the outer periphery or on the inner periphery of the tire.

The invention is particularly suited to applications in the field of truck and military vehicle tires which may be fitted to rim assemblies having no well and may have a removable flange ring or be of the split rim type.

Thus the wheel rim may be of the kind having a 15° taper on the bead seats in which case the locating means successfully prevent bead dislodgement.

Further aspects of the present invention will become apparent from the following description of two embodiments in conjunction with the diagrammatic drawings in which.

Figure 1:
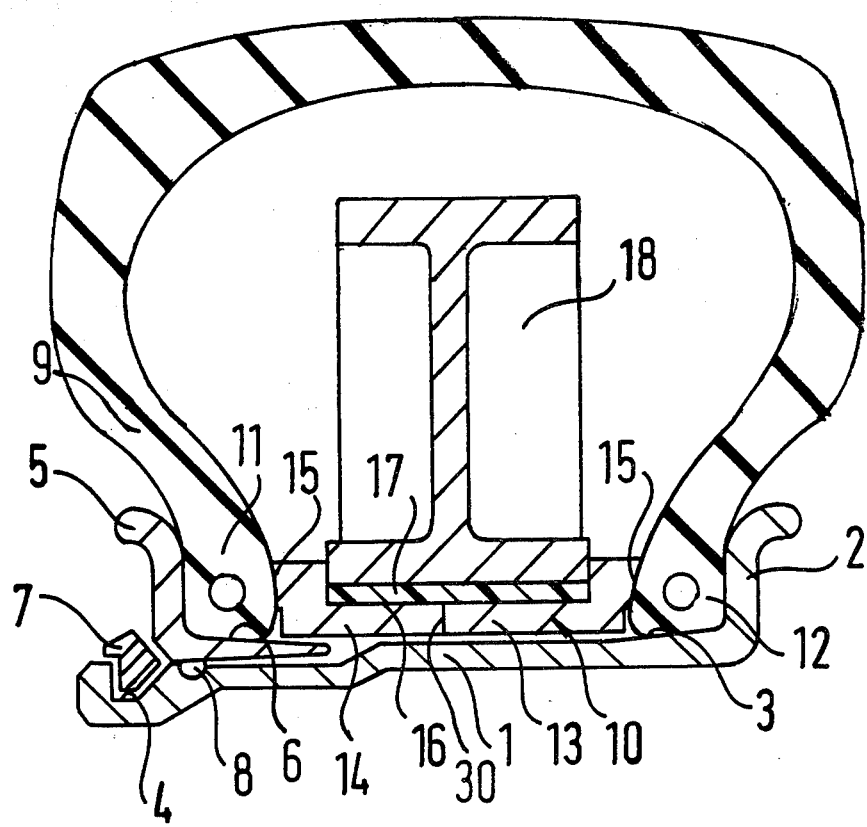
FIG. 1 is a cross-section of a tire and wheel according to one aspect of the present invention.

The tire and wheel rim assembly shown in FIG. 1 comprises a main wheel rim 1 having a first retaining flange 2 and bead seats 3 and a locking ring groove 4. A detachable flange 5 having a bead seat 6 is engaged with the main rim 1 and is retained in said engagement by means of a locking ring 7. A sealing ring 8 is provided between the main rim 1 and the detachable flange 5.

A tire 9 is located on the bead seats 3 and 6.

A bearing ring assembly 10 is fitted between the tire beads 11 and 12. The bearing ring 10 comprises two halves 13 and 14 which abut at line 30 to form the channel shape cross section bearing member 10. As shown in the drawing, the channel shaped member 10 has a mid portion which is substantially flat in the axial direction. An abutment shoulder 15 is provided on each of the two halves 13 and 14 and the abutments contact the tire beads 11 and 12 and retain them against the flanges 2 and 5.

The inner surface 16 of the channel shape bearing member 10 has a layer 17 of P.T.F.E. attached to it and a safety support member 18 is mounted within the channel so that it runs upon the P.T.F.E. bearing layer 17.

Figure 4:
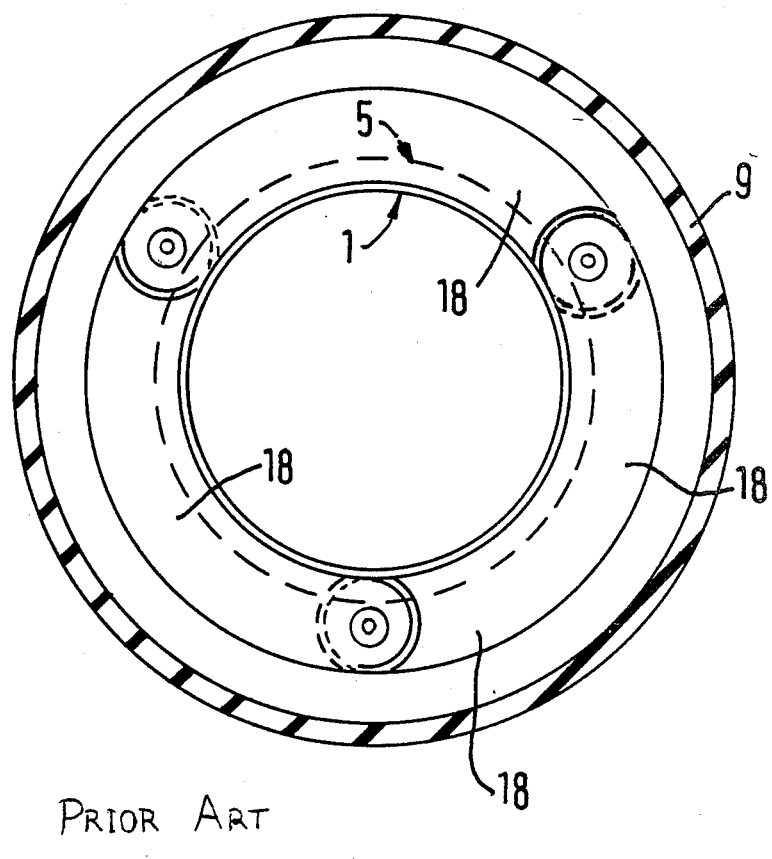
FIG. 4 is a view similar to that of FIG. 3 but showing the prior art.

The safety support member assembly is as described in British Pat. No. 1,375,415 or U.S. Pat. No. 3,635,223 and illustrated in FIG. 4 as prior art.

Figure 2:
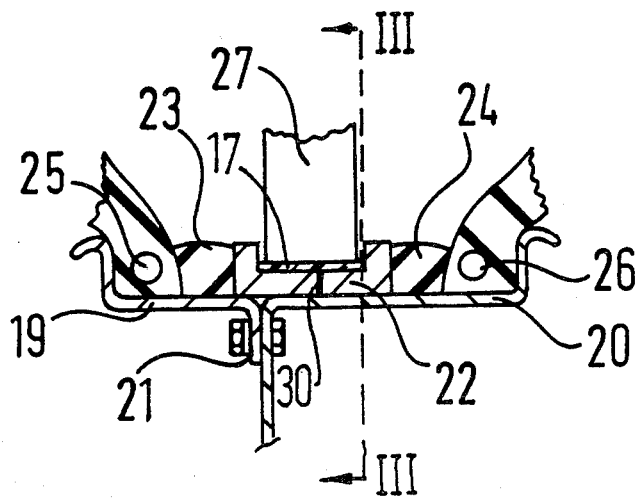
FIG. 2 is a cross sectional view taken along line II—II of FIG. 3.
Figure 3:
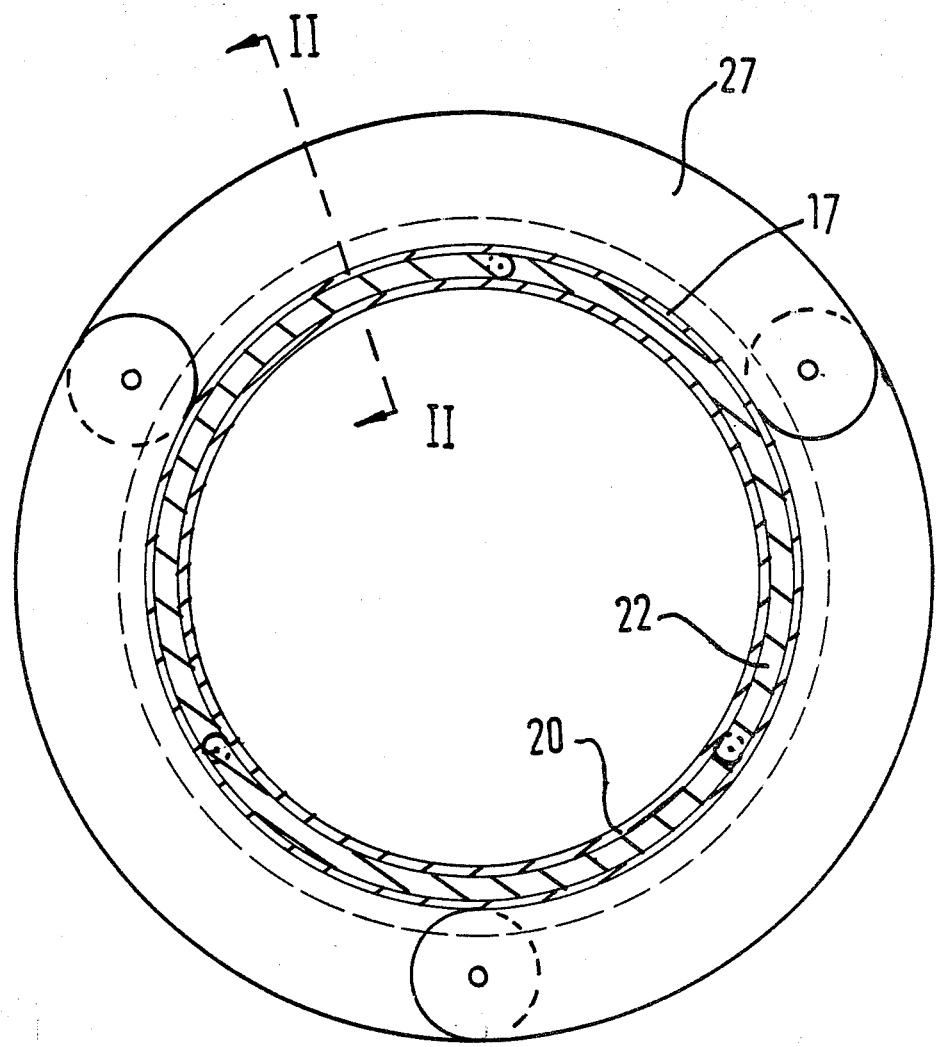
FIG. 3 is a side view, partially in section along line III—III of FIG. 2 showing the safety support member of the present invention with three sections connected end-to-end.

The embodiment shown in FIG. 2 comprises a split rim formed by two rim halves 19 and 20 held together by bolts 21 in conventional manner. A bearing ring 22 is located centrally on the rim assembly and a pair of separate spacer rings 23 and 24 are provided on either side of the bearing ring 22 to provide location for the ring and to retain the tire beads 25 and 26 against their respective flanges. The spacer rings are of rubber and are maintained under a degree of precompression by the assembly.

The bearing ring 22 is a U-shaped section extending around the rim and the support member 27 may take any of the previously mentioned forms.

Having now described our invention what we claim is:

1. A safety tire and wheel rim assembly comprising: a pneumatic tire having a tread, sidewalls and beads, a wheel rim having a pair of bead seats and between the bead seats a substantially uniform diameter, a safety support member to act as a load carrying member in the event of tire deflation, the safety support member comprising a plurality of arcuate segments of rigid material coupled together by means of coupling portions at their ends, a bearing ring of rigid material having a smaller diameter at its mid portion, said mid portion being flat and substantially axially extending with substantially radially extending edges so as to define a channel shape in cross section, providing a bearing in which the support member is rotatably mounted, the bearing ring being divided about a radial plane within the smaller diameter bearing surface of the channel section to facilitate assembly thereof about a support member; locating means contacting both tire beads to locate the bearing ring axially of the assembly and retain the tire beads in position, said locating means comprising a pair of spacer rings of resilient material, one on either side of the bearing ring, said spacer rings frictionally engaging the tire beads and the bearing ring.

2. A safety tire and wheel rim assembly according to claim 1 wherein the bearing ring comprises two or more segments interconnected end-to-end.

3. A safety tire and wheel rim assembly according to claim 1 wherein the resilient spacer rings are of rubber.

4. A safety tire and wheel rim assembly according to claim 1 wherein a coating of low friction material is provided between the bearing ring and the support member.

5. A safety tire and wheel rim assembly according to claim 4 wherein the coating comprises a P.T.F.E. layer on the bearing ring.

* * * * *